US007472812B2

(12) United States Patent
Wade et al.

(10) Patent No.: US 7,472,812 B2
(45) Date of Patent: Jan. 6, 2009

(54) METHOD AND APPARATUS FOR PRECISE LOCATION OF MATERIALS

(76) Inventors: Boyd Clark Wade, 6550 Loudon Ridge Rd., Lenoir City, TN (US) 37771; Jimmy H. Torbett, 624 Ridge Rd., Madisonville, TN (US) 37354

( * ) Notice: Subject to any disclaimer, the term of this patent is extended or adjusted under 35 U.S.C. 154(b) by 564 days.

(21) Appl. No.: 11/007,055

(22) Filed: Dec. 8, 2004

(65) Prior Publication Data

US 2005/0144889 A1 Jul. 7, 2005

Related U.S. Application Data

(63) Continuation of application No. 10/303,246, filed on Nov. 25, 2002, now abandoned.

(51) Int. Cl.
*B27F 7/05* (2006.01)
*G01C 15/02* (2006.01)

(52) U.S. Cl. ............................ 227/8; 227/55; 227/146; 227/147; 33/293; 33/296

(58) Field of Classification Search .................... 227/8, 227/9, 10, 55, 146, 147; 173/90, 91, 200, 173/202, 211; 404/85, 86, 87, 93, 94; 33/293, 33/296

See application file for complete search history.

(56) References Cited

U.S. PATENT DOCUMENTS

| | | | | | |
|---|---|---|---|---|---|
| 2,679,645 | A | * | 6/1954 | Bullwinkle et al. | 227/11 |
| 2,787,000 | A | * | 4/1957 | Smith et al. | 227/9 |
| 3,437,156 | A | * | 4/1969 | Laverty | 173/1 |
| 3,543,868 | A | * | 12/1970 | Drake | 173/21 |
| 4,441,288 | A | | 4/1984 | Feldman et al. | |
| 4,479,599 | A | * | 10/1984 | Conrad | 227/9 |
| 4,665,994 | A | * | 5/1987 | Snider | 173/90 |
| 4,813,494 | A | * | 3/1989 | Beard et al. | 173/91 |
| 4,820,041 | A | * | 4/1989 | Davidson et al. | 356/3.12 |
| 5,096,244 | A | | 3/1992 | Wilson et al. | |
| 5,110,027 | A | | 5/1992 | Burlingame | |
| 5,253,958 | A | * | 10/1993 | Bellemare | 405/232 |
| 5,282,511 | A | * | 2/1994 | Burenga et al. | 173/184 |
| 5,415,241 | A | | 5/1995 | Ruffu et al. | |
| 5,429,291 | A | * | 7/1995 | Thompson | 227/10 |
| 5,463,918 | A | | 11/1995 | Lemieux et al. | |
| 5,546,749 | A | | 8/1996 | Couchee | |
| 5,598,892 | A | | 2/1997 | Fox | |
| 5,667,021 | A | * | 9/1997 | Bailey et al. | 173/21 |
| 5,667,160 | A | * | 9/1997 | Mattson et al. | 242/348 |
| 5,671,160 | A | * | 9/1997 | Julian | 702/94 |
| 5,806,680 | A | * | 9/1998 | Barthel et al. | 206/499 |
| 6,305,480 | B1 | * | 10/2001 | Franklin | 173/27 |
| 6,321,968 | B1 | * | 11/2001 | Remerowski | 227/10 |
| 6,330,503 | B1 | | 12/2001 | Sharp et al. | |
| 6,347,672 | B1 | * | 2/2002 | Reardon | 173/90 |
| 6,564,688 | B2 | * | 5/2003 | Sabates et al. | 89/1.14 |
| 6,571,885 | B2 | * | 6/2003 | Lee et al. | 173/1 |

(Continued)

*Primary Examiner*—Rinaldi I. Rada
*Assistant Examiner*—Gloria R. Weeks
(74) *Attorney, Agent, or Firm*—Pitts & Brittian, P.C.

(57) ABSTRACT

A method and apparatus for precisely locating materials on a foundation includes an elongated survey rod, including a triggering surface, and fastener driver secured to the survey rod. The fastener driver includes a trigger. The triggering surface is located in a position to selectively activate the trigger when the fastener is located at a desired precise location on a foundation.

7 Claims, 1 Drawing Sheet

U.S. PATENT DOCUMENTS 6,588,514 B2 * 7/2003 Kozak .......................... 173/1
6,641,021 B2 * 11/2003 Jablonski .................... 227/120
6,657,734 B1 * 12/2003 Monz et al. ................. 356/601
6,905,055 B2 * 6/2005 Maier et al. ................... 227/10

* cited by examiner

METHOD AND APPARATUS FOR PRECISE LOCATION OF MATERIALS

CROSS-REFERENCE TO RELATED APPLICATIONS

This application is a continuation of application Ser. No. 10/303,246, filed Nov. 25, 2002, and claims the benefit of priority therefrom.

STATEMENT REGARDING FEDERALLY SPONSORED RESEARCH OR DEVELOPMENT

Not Applicable

BACKGROUND OF THE INVENTION

1. Field of Invention

This invention pertains to precisely identifying locations at construction sites.

More particularly, this invention pertains to a survey rod attached to a powder actuated fastener driver to permit precise location and attachment of a fastener, particularly to a foundation or other fixed object.

2. Description of the Related Art

Heretofore, after a foundation has been poured for a structure, surveyors have been called to identify the locations at which construction materials should be attached to the foundation in accordance with the construction plans. The surveyors have typically marked the proper corner locations on the foundation. Thereafter, construction workers have snapped a chalk line to identify the line along which construction materials, such as concrete blocks or plates, for example, are to be secured to the foundation. While in most situations the level of precision provided by this two-step process has been adequate, there is frequently some variation between the surveyed locations and the actual locations of the construction materials. Small differences in angles can result in large differences in distances, particularly in long walls found in commercial and industrial buildings. There are many situations in which greater precision in the locations of chalk lines are required.

BRIEF SUMMARY OF THE INVENTION

According to one embodiment of the present invention, an adapter is provided to secure a survey rod to a fastener driver whereby, while the survey rod is in the precise location for the end of a chalk line, the fastener driver is activated to drive a fastener into the concrete at the precise position required.

Another embodiment provides a combination of an adapter for connecting a survey rod and a fastener driver whereby, while the survey rod is in the precise location for the end of a chalk line, the fastener driver is activated to drive a fastener into the concrete at the precise position required.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
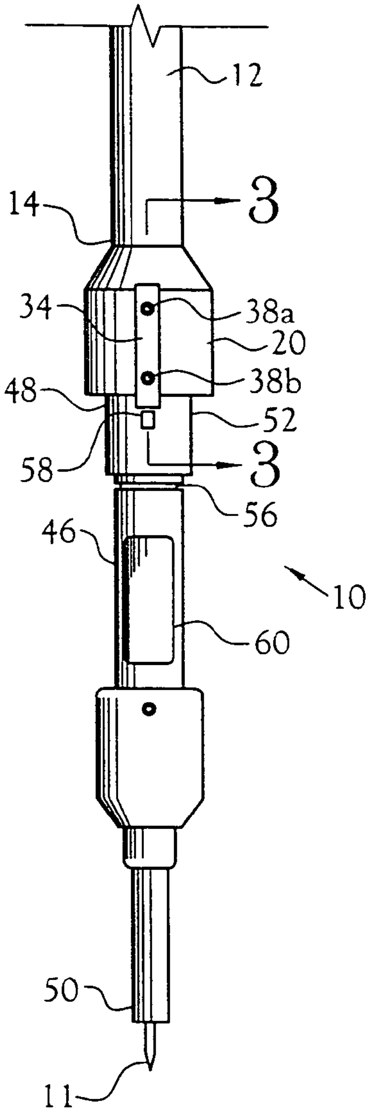
FIG. 1 is a side elevation view of an apparatus embodying various features of the present invention.
Figure 2:
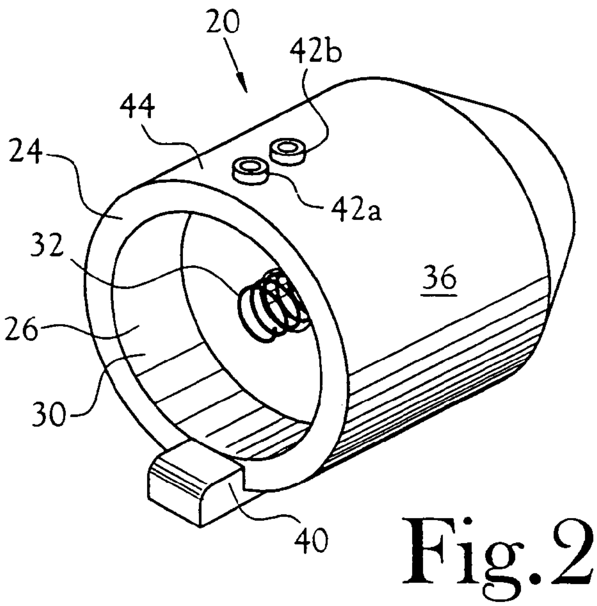
FIG. 2 is a perspective view of an adapter embodying various features of the present invention.
Figure 3:
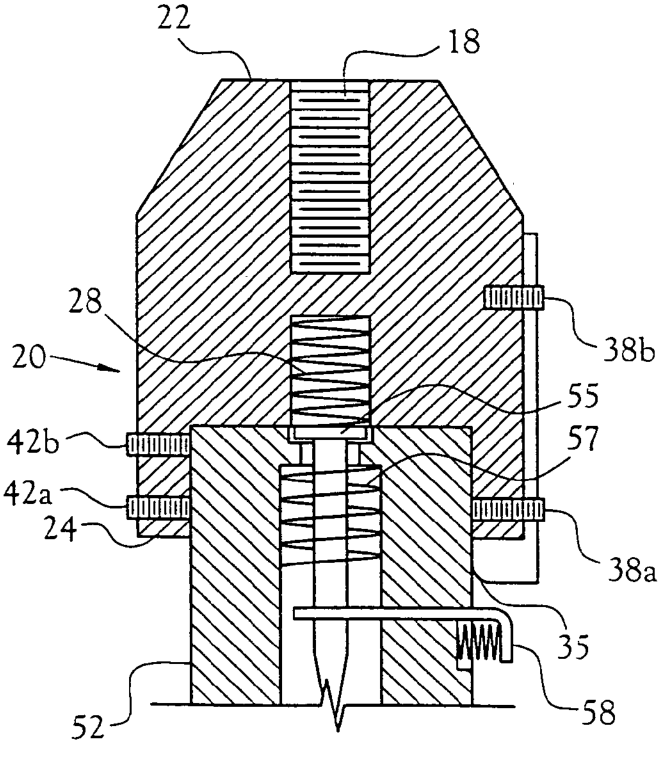
FIG. 3 is a sectional side elevation view taken along line 3-3 in FIG. 1.

Referring now to the drawings, in which like numbers represent like parts, an apparatus 10 for securing a fastener 11 in a precise location is disclosed. An elongated survey rod 12 includes a generally cylindrical connecting end 14 having a male thread (not shown) adapted to matingly engage a generally cylindrical female threaded cavity 18 of an adapter 20.

The adapter 20 is elongated, having a first end 22 and an opposing second end 24. The first end 22 defines the threaded cavity 18. The second end 24 defines a second cavity 26 comprising an inner cylindrical section 28 and an outer cylindrical section 30. The diameter of the inner cylindrical section 28 is smaller than the diameter of the outer cylindrical section 30. The inner cylindrical section 28 is coaxial with the outer cylindrical section 30.

The inner cylindrical section 28 is adapted to receive a coil spring 32 having a length greater than the length of the inner cylindrical section 28 when the coil spring 32 is in a relaxed condition, whereby the coil spring 32 extends from the inner cylindrical section 28 into the outer cylindrical section 30 when it is in a relaxed condition.

An elongated trigger bar 34, including a curved triggering surface 35, is attached to the outer surface 36 of the adapter 20, as with bolts 38*a* and 38*b*, for example. The trigger 34 is generally L-shaped to extend around the end 24 to define a shoulder 40 adjacent to the outer cylindrical section 30. Diametrically opposed from the trigger bar 34, two setscrews 42*a* and 42*b* extend through the wall 44 from the outer surface 36 and into the outer cylindrical section 30.

A fastener driver 46 adapted for use in connection with the present invention comprises a Remington powder actuated tool from which the handle has been removed. Those skilled in the art will recognize that other fastener drivers may be used in accordance with the present invention. After removal of a handle, the fastener driver 46 includes a triggering end 48 and a discharge end 50. The triggering end 48 comprises a cylindrical connecting sleeve 52. The sleeve 52 is sized to be slidingly inserted into the outer cylindrical section 30, substantially filling the outer cylindrical section 30.

The fastener driver 46 includes a trigger 58 that extends through the wall of the connecting sleeve 52 to engage the firing pin 55. The trigger 58 is located in spaced relation to the triggering surface 35 of the trigger bar 34 when the coil spring 57 is in an extended position, but close enough to the triggering end 35 to permit the triggering surface 35 to activate the trigger 58 when the coil spring 57 is compressed between the adapter 20 and the activation section 56.

The coil spring 32 extends though the connecting sleeve 52 to engage a firing pin 55 of the fastener driver 46. The coil spring 57 surrounds the firing pin 55, thus urging the connecting sleeve 52 and adapter 20 axially away from the trigger 58.

The apparatus 10 is assembled by inserting the cylindrical connecting sleeve 52 into the cylindrical outer section 30, with the coil spring 32 extending through the connecting sleeve 30 and into the inner cylindrical section 28. The connecting sleeve 52 is secured in position by attaching the trigger bar 34 to the adapter 20 with the bolts 38*a* and 38*b*. Thereafter, the setscrews 42*a* and 42*b* are tightened to engage the connecting sleeve 52. The survey rod 12 is threaded into the female threaded cavity 18 to place the survey rod 12 and the fastener driver 46 in coaxial alignment.

In operation, a fastener 11 is inserted into the discharge end 50 of the fastener driver. A powder actuator, such as a .22 caliber power load, (not shown) is inserted into the chamber 60. Using the survey rod 12 and the point of the fastener 11, a surveying crew identifies the precise location for placement of the fastener 11 to assist in attaching construction materials to a foundation. Downward pressure on the survey rod 12 compresses the coil spring 57, allowing the triggering surface 35 of the trigger bar 34 to engage the trigger 58. Activation of the trigger 58 releases the firing pin 55 to fire the power load and drive the fastener 11 into the precise location identified by the surveying crew.

Depending upon the preference of the construction personnel, the fastener 11 may be driven flush with the surface of the foundation or, alternatively, the fastener may extend above the top surface of the foundation to provide a location for attachment of a chalk line.

Those skilled in the art will recognize that various changes and modifications to the disclosed embodiments can be used without departing from the spirit and scope of the present invention.

From the foregoing description, it will be recognized by those skilled in the art that an apparatus and method for precisely securing a fastener has been provided.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for driving a fastener in a desired precise location on a foundation, said apparatus comprising:

an elongated survey rod including a triggering surface, and a fastener driver coaxially secured to said survey rod, said fastener driver including a trigger, said triggering surface being located in a position to selectively activate said trigger when said fastener is located at said desired precise location on said foundation and a downward axial force is exerted on said survey rod.

2. The apparatus of claim 1 and further comprising a spring located between said survey rod and said fastener driver to urge said triggering surface to a position spaced apart from said trigger.

3. The apparatus of claim 1 wherein said survey rod is attached to said fastener driver by an adapter having a first end and an opposed second end, said first end being secured to said survey rod and said second end being secured to said fastener driver.

4. The apparatus of claim 3 wherein said survey rod is threadably secured to said first end of said adapter.

5. The apparatus of claim 1 wherein said fastener driver comprises a powder actuated fastener driver.

6. An adapter for coaxially connecting an elongated survey rod, including an attached end and a distal end, to an elongated fastener driver, including a breech end, a discharge end and a trigger located adjacent to said discharge end, comprising:

a first cavity adapted to receive said attached end of said survey rod in a desired precise location on a foundation, a second cavity adapted to receive said discharge end of said fastener driver, a triggering surface, and a compressible spacer urging said triggering surface away from engagement with said trigger until a downward axial force is applied to said survey rod whereby said triggering surface engages said trigger.

7. The method of securing construction material in a desired precise location on a foundation comprising:

identifying a precise location on a foundation for the attachment of a piece of construction material using a survey rod, said survey rod being coaxially attached to a fastener driver including a trigger, and applying a downward axial force on said survey rod to activate said trigger with said survey rod to fasten said piece of construction material in said desired precise location on said foundation.

* * * * *